M. N. JARVIS.
REVERSING CHUCK AND TOOL HOLDER.
APPLICATION FILED FEB. 28, 1907.
943,414.
Patented Dec. 14, 1909.
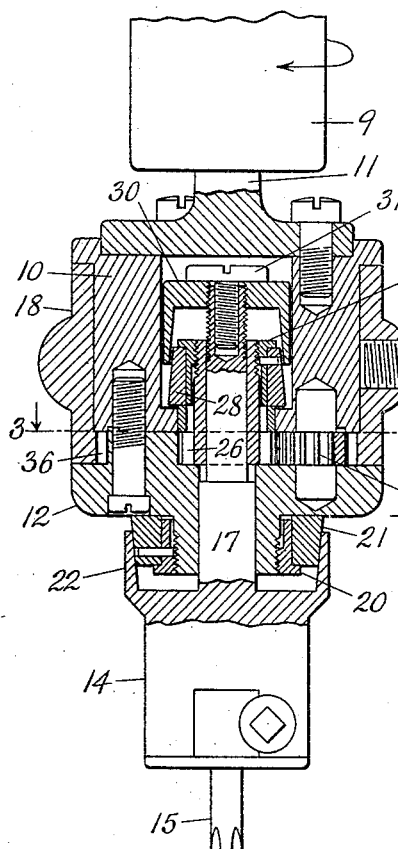
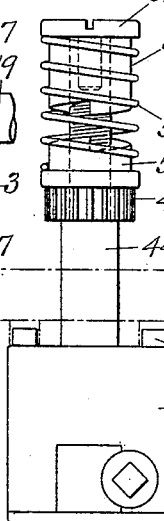
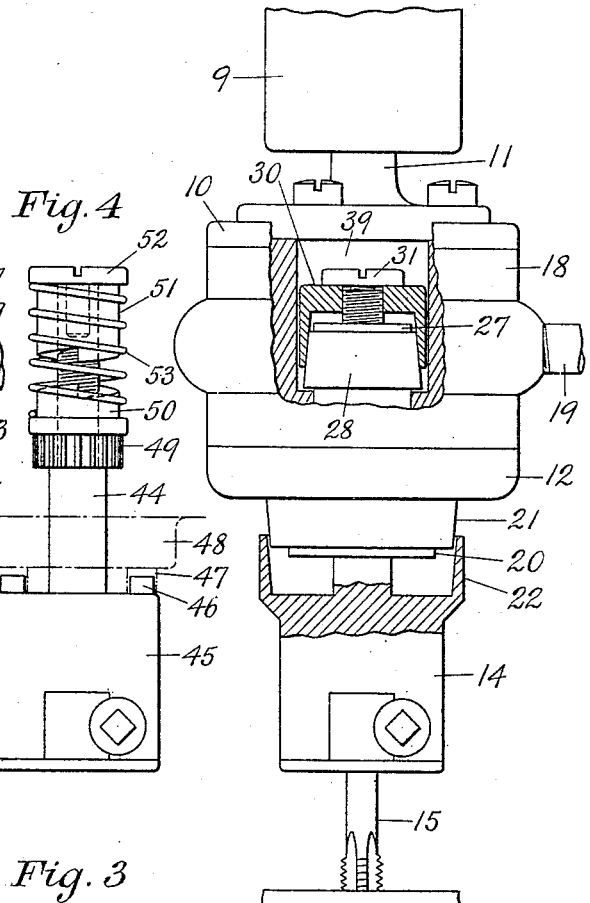
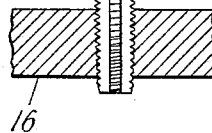
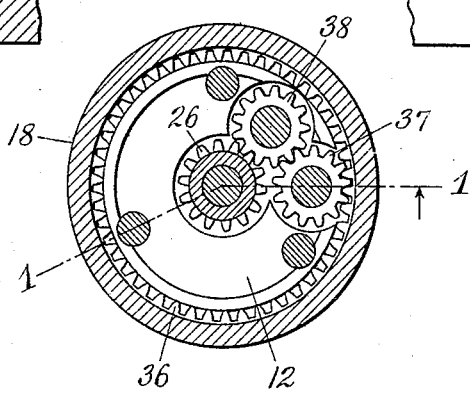
Witnesses:
H. Mallner
Janette S. Ellsworth
Inventor
Marshall N. Jarvis
By Wm H Honiss Atty

UNITED STATES PATENT OFFICE.

MARSHALL N. JARVIS, OF PORTLAND, CONNECTICUT.

REVERSING-CHUCK AND TOOL-HOLDER.

943,414.  Specification of Letters Patent. Patented Dec. 14, 1909.

Application filed February 28, 1907. Serial No. 359,741.

*To all whom it may concern:*

Be it known that I, MARSHALL N. JARVIS, a citizen of the United States, and resident of Portland, in the county of Middlesex and State of Connecticut, have invented certain new and useful Improvements in Reversing-Chucks and Tool-Holders, of which the following is a full, clear, and exact specification.

This invention relates to improvements in reversing chucks and tool holders, and is applicable to various forms of apparatus, in which rotation in alternately reverse directions is desired.

The embodiment of my invention, which I have selected for illustration and description in this application, is one which is adapted for operating a thread-cutting tap or die, in which the tap or die, after being run into or on the work, must be reversed and backed out again.

Figure 1 of the drawings is a side view partly in section taken on the line 1—1 of Fig. 3. Fig. 2 is also a side view only partly broken away to show the friction clutches. Fig. 3 is a plan view in section taken on the line 3—3 of Fig. 1, showing the reversing mechanism. Fig. 4 is a side view showing a modified form of the tool-carrying spindle, provided with positive clutch members, instead of the frictional clutch members shown in the other views of the drawing.

The body 10 of the tap holder is preferably made cylindrical and has secured at its upper end a shank 11 to be connected with the spindle 9 of a drill press or any other suitable machine tool. The chuck or tool holder 14 which in this instance carries the tap 15 has a spindle 17 extending through and revolving in a cap 12. The ring 18, having a handle 19, is journaled in a peripheral recess around the body and is held in place by the cap 12.

The forward rotations of the chuck 14 to carry the tap 15 into its work are imparted directly from the body 10 by means of clutch members 21 and 22 appurtenant to the cap 12 and to the chuck 14, respectively. The clutch member 21 is preferably a removable conical ring made of compressed fiber and is held in place upon the cap by means of a nut 20 to which the ring is preferably secured by pins. The "hand" or spiral direction of the thread of the nut 20 is such that the driving action tends to screw the nut more tightly on the cap. For example, for operating the right handed tap as shown in the figures, the nut 20 should be provided with a right hand thread. The co-acting clutch member 22 of the chuck 14 may, as herein shown, be integral with the chuck; or it may, if desired, be made removable.

The reverse or backward rotations of the chuck 14 are imparted by means of friction members situated in the interior recess 39 of the body and driven by a reversing train of gearing. The spindle or shank 17 of the chuck 14 is mounted for rotary and longitudinal movement relative to the body 10, being for convenience of construction and assembling journaled in the separable cap 12, which, however, when in operation, is practically an integral part of the body 10. The reversing gear 26 is journaled in the body and revolves freely around the spindle 17 during the forward driving movement of the tool. The upper end of the pinion 26 has fixed upon it a conical clutch ring 28 removably secured by means of the nut 27, to which the clutch ring is preferably pinned. The thread of the nut is preferably right handed, in order that the reaction of its driving movement shall tend to screw the ring more firmly to its seat, instead of unscrewing it therefrom, as would be the tendency if a left handed thread were employed. The upper end of the spindle 17, extending through and above the gear 26 is provided with a friction cone 30, which for convenience of assembling and adjustment is screwed upon the upper end of the spindle 17, by means of a right hand thread; and is locked in its desired position by means of the binding screw 31, which is made left handed so as to resist any tendency of the cone to unscrew the spindle 17.

The reversing gear 26 is rotated in the direction opposite to that of the body 10, by means of intermediate pinions 37 and 38 which are journaled in the body 10 and its cap 12, and as best shown in Fig. 3, connects the reversing gear 26 with the teeth of the internal gear 36, which is integral with or appurtenant to the ring 18 and is provided with a handle 19 by means of which the ring 18 and the internal gear 36 are held stationary during the rotations of the body 10 as it is driven by the spindle 9. The gears 37 and 38, revolving with the body but remaining in mesh with the stationary gear 36 transmit to the reversing gear 26 a continuous rotative movement opposite to that of the spindle 9, and preferably at a higher speed, in order to lessen the time required for retracting the tool.

With this apparatus it is unnecessary to reverse the direction of rotation of the spindle 9 of the machine upon which the apparatus is employed, thus making it applicable to many machines, such as drill presses, which for their customary functions are not generally provided with means for reversing the direction of rotation of the spindle.

In operation, the work 16 is held by a vise or any suitable fixture in proper register with the spindle 9, which rotates constantly in the direction of the arrow, and only requires to be lowered toward the work to drive the tap forwardly through the work and then raised to retract the tap by unscrewing it from the work. The handle 19 may swing against any convenient portion of the frame of the drill press or other machine employed to hold the ring 18 and its appurtenant internal gear 36 from rotating with the body, while permitting the body to rotate freely within the ring. As the spindle is lowered and the tap engages with the work, the forward driving clutch members 21 and 22 are brought into engagement as shown in Fig. 1, so that the tap and its chuck 14 turn with the body 10 and spindle 9 as though integral therewith, thus carrying the tap forward through the work. When the tap has been carried far enough the downward and forward movement is stopped by raising the spindle, which disengages the clutch members 21 and 22, and by continued lifting movement brings the reversing clutch members 28 and 30 into engagement as shown in Fig. 2, thereby rotating the chuck 14 and the tap 15 in the reverse direction, thus withdrawing it from the work, preferably by a faster movement, which, however, can be of any desired speed, according to the speed ratio of the reversing train of gears.

Any other convenient or available means suited to the machine upon which the apparatus is used may be substituted for the handle 19 for holding the ring 18 and its internal gear 36 stationary.

When employed for work upon which it is desirable to tap the successive holes to uniform depth, the stop commonly employed for the spindle of a drill press may be employed for stopping the downward movement of the spindle 9 at the same position each time.

The modified form of chuck 45 shown in Fig. 4 is adapted to be driven positively in both directions. It is driven in the forward direction by the pins 46 of the chuck engaging with the pins 47 of the cap or body 48. The reversing movement is imparted to the reversing gear 49 which may be constructed, mounted and driven in the body 10, as already described in connection with the reversing gear 26, and may in fact be substituted for that gear. The reversing gear 49 has fixed to it the positive clutch member 50, while the upper end of the chuck spindle 44 has fixed upon it the coacting clutch member 51 secured by means of the binding screw 52. A spring 53 is also preferably provided to sustain the weight of the spindle 44 and chuck 45, tending normally to keep the clutch members 50 and 51 separated.

If it is desired to drive the tap forwardly by a friction clutch and return it by a positive clutch the lower or driving clutch members may be like those shown in Fig. 1, using positive clutch members as 50 and 51 for the return movement.

Obviously, the chuck or tap holder 14 may be in the form of a die holder, for the threading of screws or studs, held in a vertical position by a suitable vise or fixture. Or the chuck 14 may in some instances, particularly in the case of small and symmetrical pieces of work, be employed as a work-carrying holder or chuck, the tap in that case being inverted from its position shown in the figures and held stationary by means of a suitable vise. In many other ways which will suggest themselves to those familiar with this line of work, the relative positions and directions of movement may be reversed or otherwise modified to suit different requirements or conditions of service.

I claim as my invention:—

1. The combination, in a reversing chuck or tool holder, of a frame or body mounted for rotation, a tool spindle journaled in the body for rotation and longitudinal movement, clutch members for connecting the body and the spindle to drive the latter in one direction, a train of reversing gearing including a non-rotating internally toothed gear, and a reversing gear mounted for rotation upon and around the tool spindle, and clutch members for connecting the reversing gear and the tool spindle, whereby the latter, by its longitudinal sliding movement in the body and in the said reversing gear is clutched for forward or reverse rotation.

2. The combination, in a reversing chuck or tool holder, of a frame or body mounted for rotation, a reversing train of gearing carried by the body, including a non-rotating internally toothed gear, and a centrally mounted reversing gear, a forward driving clutch appurtenant to the body, a reversing driving clutch appurtenant to the reversing gear, and a tool spindle mounted for rotary and longitudinal movement in the body and in the reversing gear, and provided with clutch members disposed in coacting relation to the said clutch members of the body and of the reversing gear.

3. The combination, in a reversing chuck or tool holder, of a frame or body mounted for rotation, a reversing chain of gearing carried by the body, including a non-rotating internally toothed gear, and a reversing gear mounted for rotation concentrically with the body, pinions mounted for rotation in the body and revolving therewith, and connecting the non-rotating internal gear with the reversing gear to rotate the latter continuously in its reversing direction, a tool spindle mounted for rotation and for longitudinal sliding movement within the body and the said reversing gear, forward driving clutch devices between the spindle and the body, and reverse driving clutch devices between the said reversing gear and the spindle, whereby either clutch device is made operative by the longitudinal movement of the spindle.

4. The combination, in a reversing chuck or tool holder, of a frame or body mounted for rotation, a clutch member appurtenant to the body, a reversing gear journaled for rotation within and concentrically with the body, and provided with a clutch member, a non-rotating internal toothed gear journaled around the periphery of the body concentrically with the said reversing gear, and a plurality of intermediate gear pinions journaled for rotation in and for revolution with the body and permanently meshing with the reversing gear, the internal gear, and with each other.

5. The combination, in a reversing chuck or tool holder, of a frame or body mounted for rotation, a reversing gear journaled for rotation concentrically with the body, and provided with a clutch member, an internal toothed gear mounted upon the outside of the body to permit rotation of the body, means for holding the internal gear permanently stationary while the body rotates within it, intermediate gears journaled for rotation in and for revolution with the body, and connecting the internal gear with the reversing gear to rotate the latter continuously in a direction reverse to that of the rotation of the body, and a tool-carrying spindle journaled in the body for rotary and longitudinal movement and extending through the reversing gear, the spindle being provided with clutch members situated in co-acting relation to the clutch members of the body and of the reversing gear, respectively, whereby either set of clutch members may be brought into engagement by the longitudinal movement of the spindle.

6. The combination in a reversing chuck or tool holder, of a frame or body mounted for rotation and provided with a clutch member, a reversing gear journaled for rotary movement relative to the body and provided with a clutch member, a tool carrying spindle carried by the body and provided with clutch members for coacting with the said clutch members of the body, and of the reversing gear, respectively, and means for adjustably securing one of said clutch members upon the spindle, including a screw threaded connection between the clutch member and the spindle, and a reversely threaded screw engaging the spindle and the clutch member.

7. The combination in a reversing chuck or tool holder, of a frame or body, a reversing gear journaled for rotation in the body, a conical friction clutch member appurtenant to the reversing gear, a work carrying spindle journaled in the body to slide in the said reversing head, and provided with a clutch member having an internal conical surface for coacting with the said clutch member of the reversing gear, the said clutch member being adjustably mounted upon the spindle by means of the screw thread on one hand, and a locating screw on the opposite hand, tapped into the end of the spindle, and having a bearing shoulder clamping against the clutch member.

MARSHALL N. JARVIS.

Witnesses:
OLIVER GILDERSLEEVE,
WALTER GILDERSLEEVE.